United States Patent [19]

Kang et al.

[11] Patent Number: 5,631,893
[45] Date of Patent: May 20, 1997

[54] MULTI-HEAD DEVICE FOR OPTICAL DISK AND RECORDING/REPRODUCING SYSTEM FOR MULTIPLE USERS UTILIZING THE SAME

[75] Inventors: Jin-ku Kang; Sung-han Ha, both of Seoul; Tae-seok Park, Suwon; Chul-woo Lee, Seoul, all of Rep. of Korea

[73] Assignee: Samsung Electronics Co., Ltd., Kyungki-do, Rep. of Korea

[21] Appl. No.: 365,824

[22] Filed: Dec. 29, 1994

[30] Foreign Application Priority Data

Jun. 30, 1994 [KR] Rep. of Korea ............... 94-15685

[51] Int. Cl.⁶ .................................................. G11B 9/00
[52] U.S. Cl. ..................... 369/126; 369/13; 369/49; 369/44.15; 369/44.18; 360/70; 360/72.1
[58] Field of Search .......................... 369/124, 126, 369/13, 32, 47, 49, 54, 71, 44.12, 44.15, 44.16, 44.18, 44.19; 360/64, 69, 70, 71, 72.1; 250/227.14, 227.24

[56] References Cited

U.S. PATENT DOCUMENTS

| | | | |
|---|---|---|---|
| 4,626,679 | 12/1986 | Kuwayama et al. | 369/44.19 |
| 5,050,013 | 9/1991 | Holsinger | 360/72.1 |
| 5,109,305 | 4/1992 | Ohsawa et al. | 360/70 |
| 5,130,863 | 7/1992 | Yamashita et al. | 369/49 |
| 5,202,801 | 4/1993 | Fukuda | 360/70 |
| 5,233,587 | 8/1993 | Asano et al. | 369/44.19 |
| 5,295,122 | 3/1994 | Murakami et al. | 369/44.18 |
| 5,319,622 | 6/1994 | Martin | 369/49 |
| 5,448,367 | 9/1995 | Park et al. | 360/70 |
| 5,455,809 | 10/1995 | Naraoka | 369/13 |

OTHER PUBLICATIONS

K. Yasukawa, et al., "A New Flying Optical Head"; Japanese Journal of Applied Physics, 1989, pp. 205–208.

Willem G. Ophey, "Compact Optical Light Paths"; Philips Research Laboratories, pp. 12–13.

Masaharu Takano, "Pioneer Prototypes Videodisc System for 'Near Video on Demand' Services"; Nikkei Electronics Asia, Mar. 1994.

*Primary Examiner*—Loha Ben
*Attorney, Agent, or Firm*—Leydig, Voit & Mayer

[57] ABSTRACT

A recording/reproducing system for multiple users is disclosed which includes a plurality of channels connected to multiple users, a data processing portion for processing a signal of input/output information of an optical disk, and an optical head portion for reading and writing the information of optical disk. The optical head portion has at least one ultra-slim, subminiature multi-head device commonly having at least two optical heads, thereby allowing individuals to process desired information at any time.

21 Claims, 7 Drawing Sheets

MULTI-HEAD DEVICE FOR OPTICAL DISK AND RECORDING/REPRODUCING SYSTEM FOR MULTIPLE USERS UTILIZING THE SAME

BACKGROUND OF THE INVENTION

The present invention relates to a multi-head device for an optical disk capable of writing/reading information on/from the optical disk, and a recording/reproducing system for multiple users utilizing the multi-head device, and more particularly, to a multi-head device for an optical disk and a recording/reproducing system for multiple users utilizing the same in which multiple users may each record or reproduce information with respect to one disk.

As is known in the art, an optical disk drive in which a recordable magneto-optical disk is loaded has a large capacity. The use of optical disk drives is being expanded to an auxiliary memory device for personal computers. Accordingly, the optical disk drive should have a plurality of optical heads corresponding to multiple users, so that they each may process information independent of time with respect to one disk loaded therein.

In the conventional technologies, for example, in a cable television systems, use has been made of a video disk drive which has four optical heads disposed at 90° intervals and provides images through four lines (see *Nikkei Electronics Asia*, March, 1994, pp30 & 31). However, the four optical heads of the video disk drive operate merely to sequentially read out the same information (or image) at predetermined time intervals but cannot be selectively and freely operated by multiple users. In other words, the purpose of such a video disk drive is to give one user four times the opportunity for viewing the same image.

Therefore, improvements to the above system are being sought, to realize independent operation of the above four optical heads, such that four users each can process desired information (view images) at any time. Also, to accommodate more users, additional optical heads should be installed and the optical heads should be reduced in size accordingly. However, given a 30 cm-diameter disk, the practical limit to the arrangement of ordinary optical heads mandates four such heads at most.

SUMMARY OF THE INVENTION

It is an object of the present invention to provide a multi-head device for an optical disk which has as many optical heads as possible installed for one disk and in which the optical heads each can independently operate to read/write the information of the optical disk.

It is another object of the present invention to provide a recording/reproducing system for multiple users which allows each user to process desired information at any time by using the multi-head device for an optical disk.

To accomplish the first object of the present invention, there is provided a multi-head device for an optical disk including a plurality of optical heads each for emitting a light signal so as to optically read and/or write information with respect to one disk, the device comprising a plurality of rotation plates rotatably supported on one axis, a plurality of arm members connected to the plurality of rotation plates, respectively, and on the respective front portions of which the respective objective lenses of the plurality of optical heads are mounted, driving means for rotating the plurality of rotation plates, respectively, and focusing means for controlling the focusing location of the objective lens according to vibrations of the optical disk.

To accomplish the second object of the present invention, there is provided a recording/reproducing system for multiple users in which the multiple users are able to record/reproduce information on/from one optical disk. The system comprising an optical head portion having a plurality of optical heads each for emitting a light signal to read and/or write information from/on the optical disk, a plurality of channels each having a data input port and a data output port, and a data processing portion for processing a signal input via the respective data input ports of the plurality of channels to drive the optical head, and processing a signal read out from the plurality of the optical heads to output the processed signal to the respective output ports of the plurality of channels.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
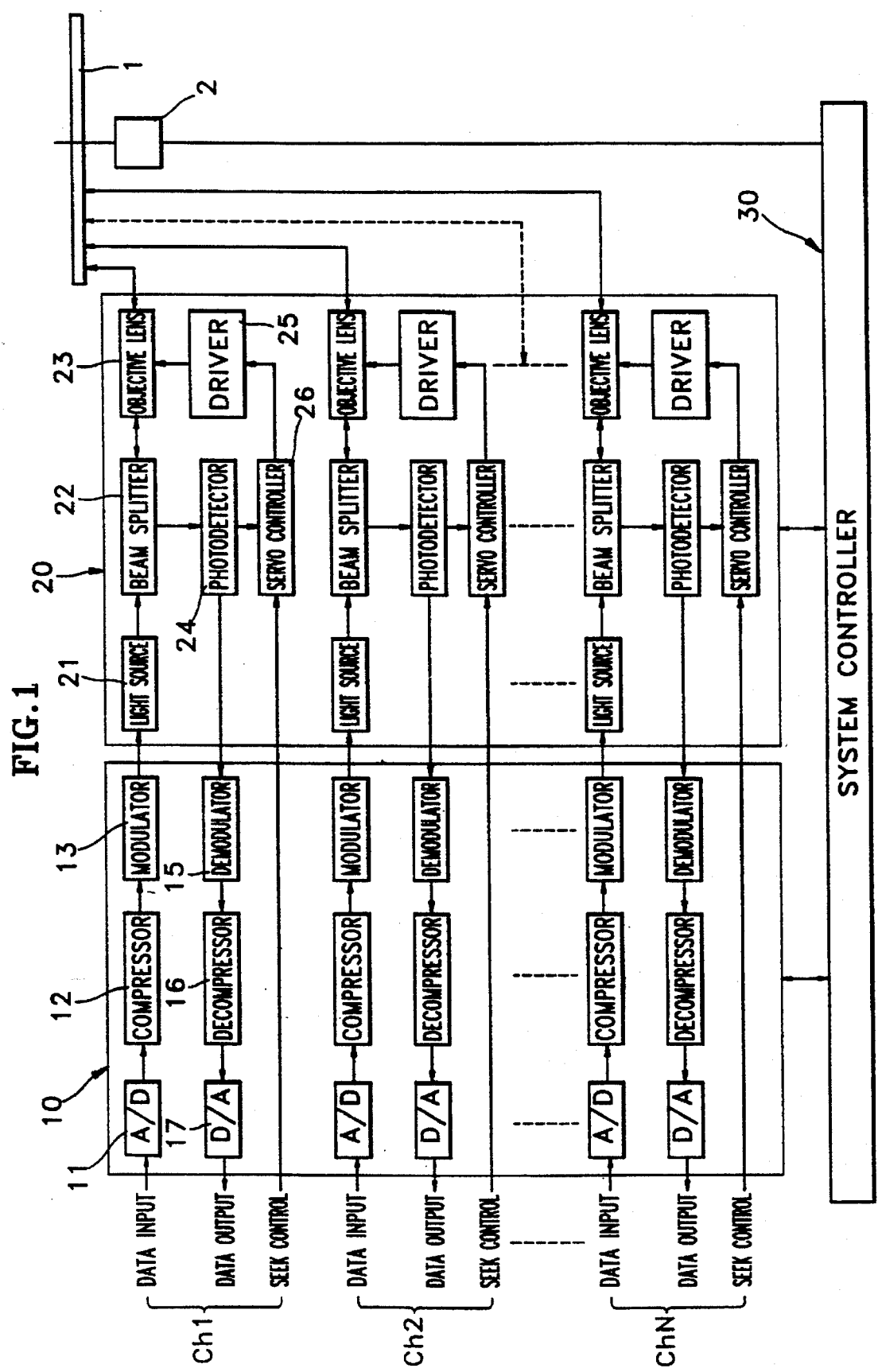
FIG. 1 is a block diagram of a recording/reproducing system for multiple users of the present invention.

Referring to FIG. 1, an optical disk 1 is loaded on a spindle motor 2 and rotates at a predetermined speed under the control of a system controller 30. The recording/reproducing system of the present invention comprises multiple channels Ch1-ChN having a data input port, a data output port, and a seek control signal port, a data processing portion 10, an optical head portion 20, and a system controller 30. The respective channels are coupled to individual information processors, for instance, personal computers or televisions via cables. Data processing portion 10 and optical head portion 20 are selectively controlled by system controller 30.

Data processing portion 10 comprises an analog-to-digital (A/D) converter 11 for converting an analog signal input via the data input port of a user selected channel into a digital signal, a compressor 12 for compressing the digitized input signal, and a modulator 13 for modulating the compressed signal to drive a light source 21 of the optical head portion 20. Data processing portion 10 further comprises a demodulator 15 for demodulating the detection signal of a photodetector 24 of optical head portion 20, a decompressor 16 for decompressing the compressed information of the demodulated detection signal, and a digital-to-analog (D/A) converter 17 for converting the digital signal of the decompressed detection signal into an analog signal to transmit the converted analog signal to the user via the data output port of the selected channel among channels Ch1-ChN.

In addition, optical head portion 20 is made up of a plurality of optical head devices corresponding to the respective channels Ch1-ChN, and comprises light source 21 for generating a light signal modulated by modulator 13, a beam splitter 22 for splitting the modulated light signal, and light reflected from the optical disk, an objective lens 23 for converging the light signal passing through beam splitter 22 onto the optical disk, photodetector 24 for detecting the optical disk information signal from the reflection light reflected from optical disk 1 and then passed through objective lens 23 and beam splitter 22, to thereby transmit the detected signal to demodulator 15 of data processing portion 10, an objective lens driver 25 for driving objective lens 21 vertically and laterally, and a servo controller 26 for controlling objective lens driver 25 with the detection signal of photodetector 23 and the seek control signal. The objective lens driver 25 includes means for fine seek movement on the basis of the tracking/focusing error signal of servo controller 26 and means for coarse seek movement on the basis of the external seek control signal. Detailed construction of the objective lens driving circuit is explained subsequently.

Figure 2:
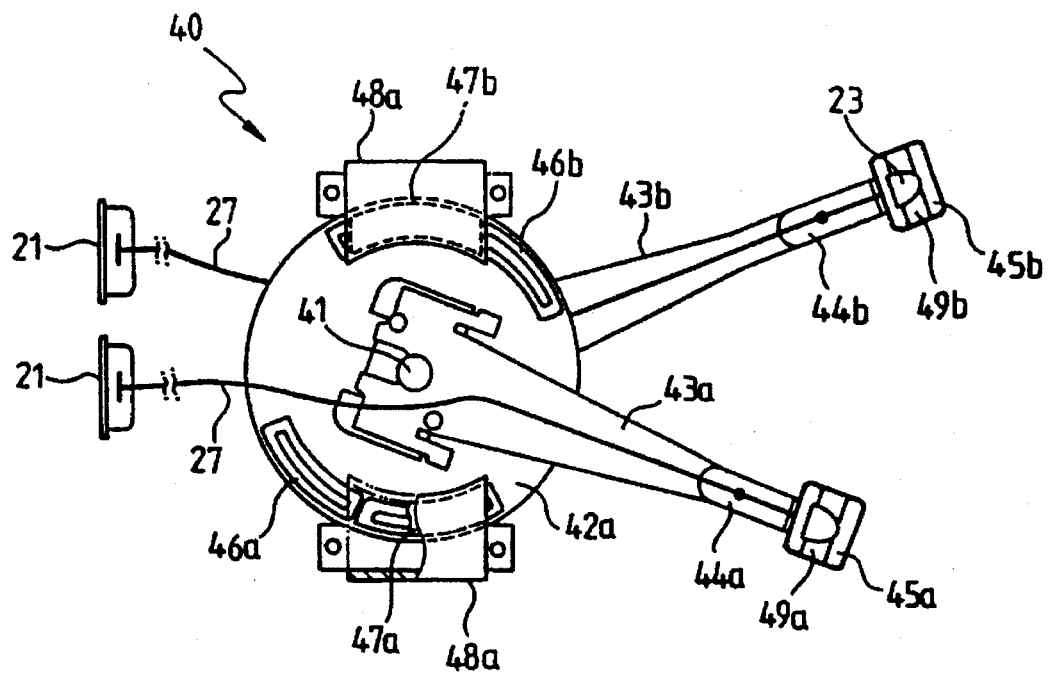
FIG. 2 is a plan view of a multi-head device used in the recording/reproducing system for multiple users shown in FIG. 1.
Figure 3A:
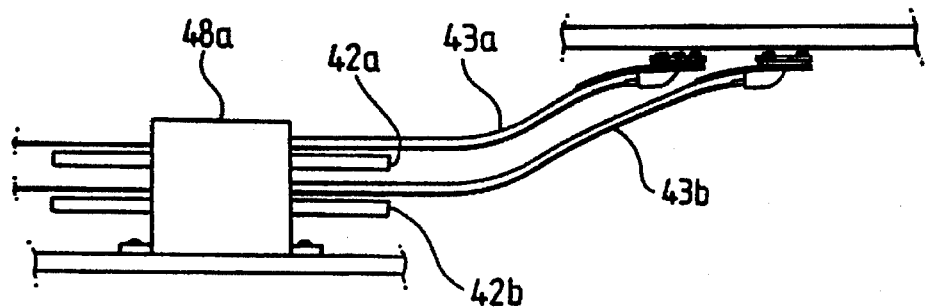
FIG. 3A is a side view of the multi-head device of FIG. 2
Figure 3B:
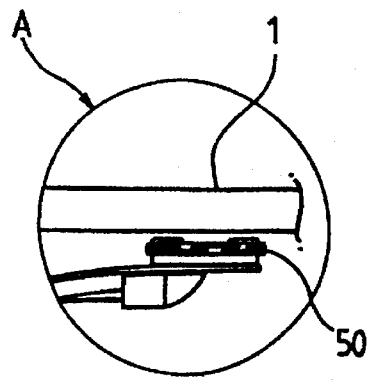
FIG. 3B is an enlarged view of one of the heads.

FIGS. 2, 3A, and 3B illustrate an optical head device constituting optical head portion 20. This device is a subminiature type or an ultra-slim type. In the drawings, there is shown a multi-head device 40 having two optical heads in common for one pair of the plurality of channels (FIG. 1).

Two rotation plates 42a and 42b are rotatably supported to a support shaft 41. Swing arms 43a and 43b are integrally coupled to rotation plates 42a and 42b, respectively. Swing arms 43a and 43b are bent toward optical disk 1 but do not come into contact with each other. Leaf springs 44a and 44b are tied to the respective ends of swing arms 43a and 43b. Sliders 45a and 45b are supported by leaf springs 44a and 44b, respectively. Objective lens 23 is installed on the respective sliders 45a and 45b. A pair of driving coils 46a and 46b are attached to rotation plates 42a and 42b at the opposing edges thereof. Magnets 47a and 47b and yokes 48a and 48b are provided for each pair of driving coils 46a and 46b, respectively. Here, if a predetermined voltage is applied to driving coil pair 46a and 46b, an electromagnetic force is induced by magnets 47a and 47b, to rotate rotation plates 42a and 42b clockwise or counterclockwise. As rotation plates 42a and 42b rotate, objective lens 23 moves in the seek direction of the optical disk. As the external seek control Signal is applied to driving coils 46a and 46b, the coarse seek function is performed. Also, as the tracking error signal of servo controller 24 is applied to driving coils 46a and 46b, the coarse seek in the seek direction, that is, a tracking servo control operation, is performed. Grooves 49a and 49b formed in sliders 45a and 45b are provided for forming an air cushion during the movement so that objective lens 23 does not make direct contact with optical disk 1.

Reference numeral 21 represents a light source required for two channels of the data processing portion 10. Reference numeral 27 indicates an optical fiber cable (waveguide) for transmitting the light signal produced from light source 21. Reference numeral 50 is a focusing coil for fine seek movement in the focus-direction of objective lens 23 with respect to optical disk 1.

Figure 4:
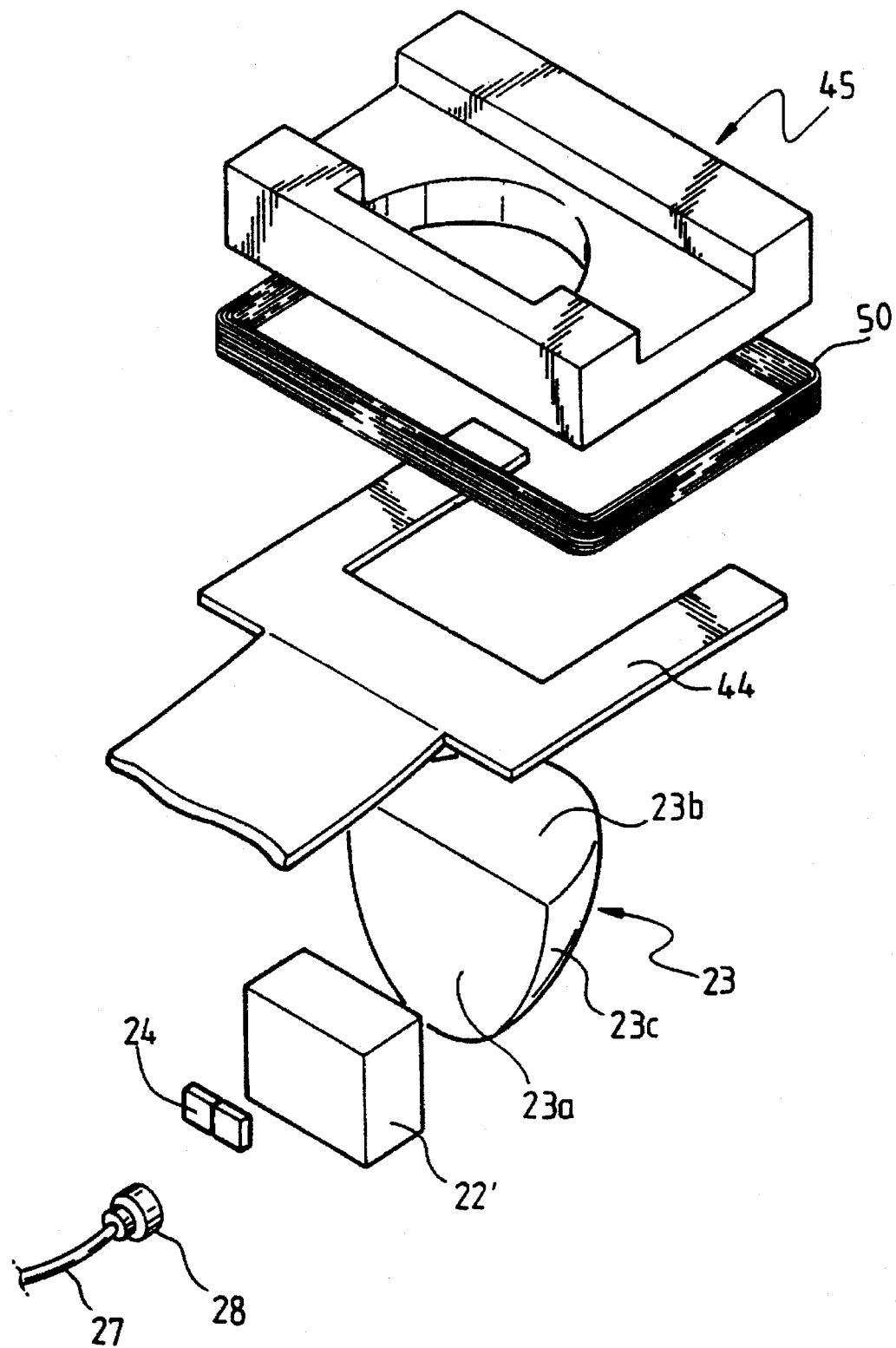
FIG. 4 is an exploded perspective view for illustrating the structure of portion A of FIG. 3.

Referring to FIG. 4, objective lens 23 installed on slider 45 has an incoming plane 23a and an outgoing plane 23b which are perpendicular to each other, and a reflection plane 23c for connecting the edges of incoming plane 23a and outgoing plane 23b. Reflection plane 23c maybe spherical, aspherical or parabolic to converge the light signal passing incoming plane 23 onto the optical disk. The upper portion of objective lens 23 is inserted into the D-shaped opening (no reference numeral) of slider 45 through leaf spring 44. As the beam splitter, a grating 22' is attached to the incoming plane 23a of the objective lens 23. Photodetector 24 and light connector 28 of optical fiber cable 27 are attached to the front of grating 22'.

Figure 5:
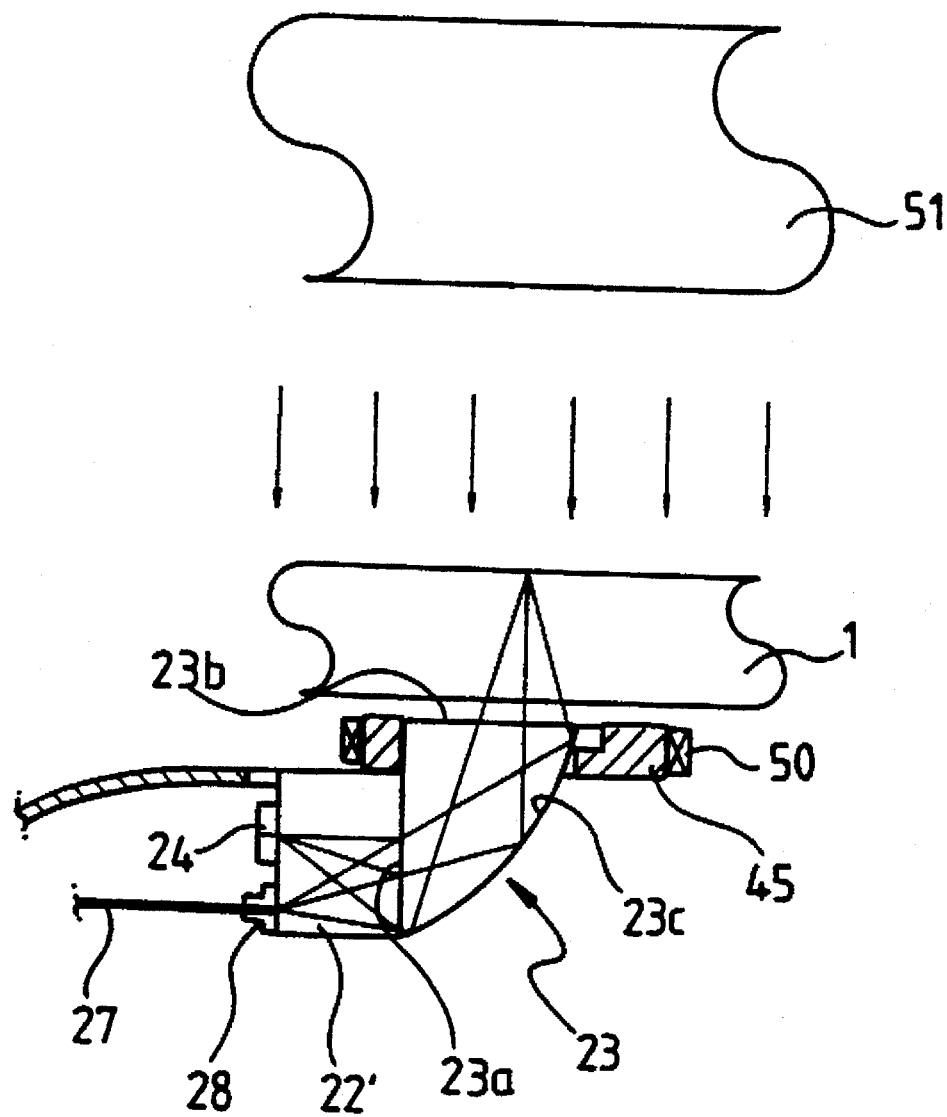
FIG. 5 is a partial cross-sectional view of one embodiment of the focus servo means of an objective lens employed in the multi-head device of the present invention.

Referring to FIG. 5, the light signal transmitted along optical fiber cable 27 is emitted from the outgoing port thereof. The emitted light signal is transmitted through grating 22' and incoming plane 23a of objective lens 23 and is reflected from reflection plane 23c. The light signal reflected from reflection plane 23c of objective lens 23 focuses onto the surface of optical disk 1 through outgoing plane 23b. The reflected light of optical disk 1 is incident on outgoing plane 23b of objective lens 23 and is reflected from reflection plane 23c to enter incoming plane 23a. Here, the reflected light is diffracted at the intersurface border of incoming plane 23a of objective lens 23 and grating 22'. The diffracted light is thereafter directed toward photodetector 24, and detected as the signal of photodetector 24. The reflected light received by photodetector 24 contains information indicative of the location of a light spot focused on the optical disk, that is, the focusing/tracking locations of objective lens 23, as well as the read optical disk information. The servo controller extracts the focusing/tracking error signal from the detection signal of photodetector 24 which is then applied to focusing coil 50 and the aforementioned driving coil, to thereby compensate for any error.

In FIG. 5, reference numeral 51 is a magnet for vertically driving objective lens 23 along with focusing coil 50 to perform a focus servo control operation. As a voltage is applied to focusing coil 50, focusing coil 50 is excited to thereby become an electromagnet. According to the direction (polarity) of the applied voltage, the focusing coil attracts or repels the magnetic flux produced in magnet 51 so that the focusing coil vertically moves along with slider 45 and objective lens 23.

Figure 6A:
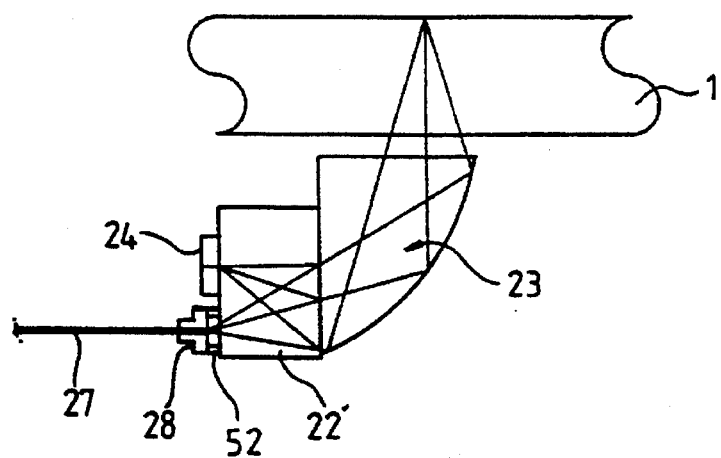
FIG. 6A is a side view of another embodiment of the focus servo means of the objective lens employed in the multi-head device of the present invention.
Figure 6B:
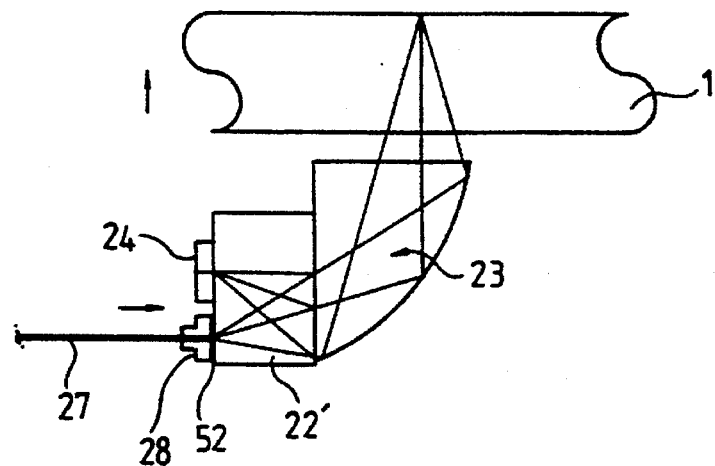
FIG. 6B is a side view of a focusing state in which the optical disk of FIG. 6A is far from the objective lens.
Figure 6C:
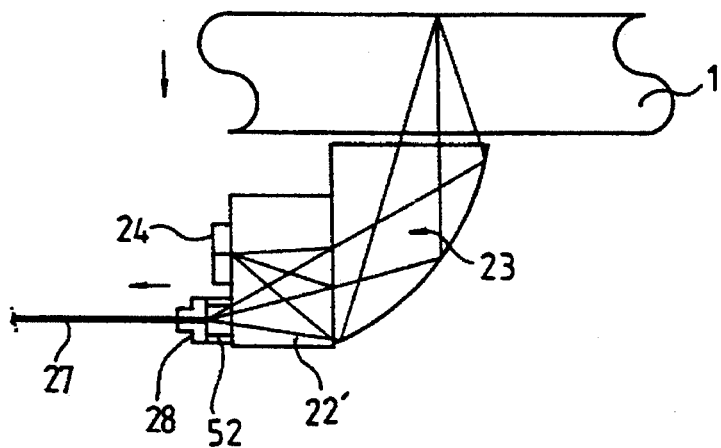
FIG. 6C is a side view of a focusing state in which the optical disk of FIG. 6A is close to the objective lens.

FIG. 6A illustrates a simpler example for the focus servo of objective lens 23. In this example, instead of the focusing the coil and magnet, a piezo-electric element 52 is provided between grating 22' and light connector 28. Piezo-electric element 52, being connected to a high-frequency generator (not shown) for generating a high frequency signal from the focus error signal of the servo controller, operates to expand or contract mechanically according to the high frequency signal. FIG. 6A shows a state in which the recording surface of optical disk 1 lies on the focal plane of objective lens 23. In this state, as optical disk 1 deviates from the focal plane, as shown in FIG. 6B or 6C, piezo-electric element 52 expands or contracts to shift the light exiting point of optical fiber cable 27, that is, the incident location of the light signal. This stage performs the error compensation.

As described above, with the optimization of optical components and the thinness of a driving portion, the multi-head device of the present invention is manufactured in a subminiature or ultra-slim type so that many can be installed in a narrow space. This case will be illustrated in FIGS. 7 and 8.

Figure 7:
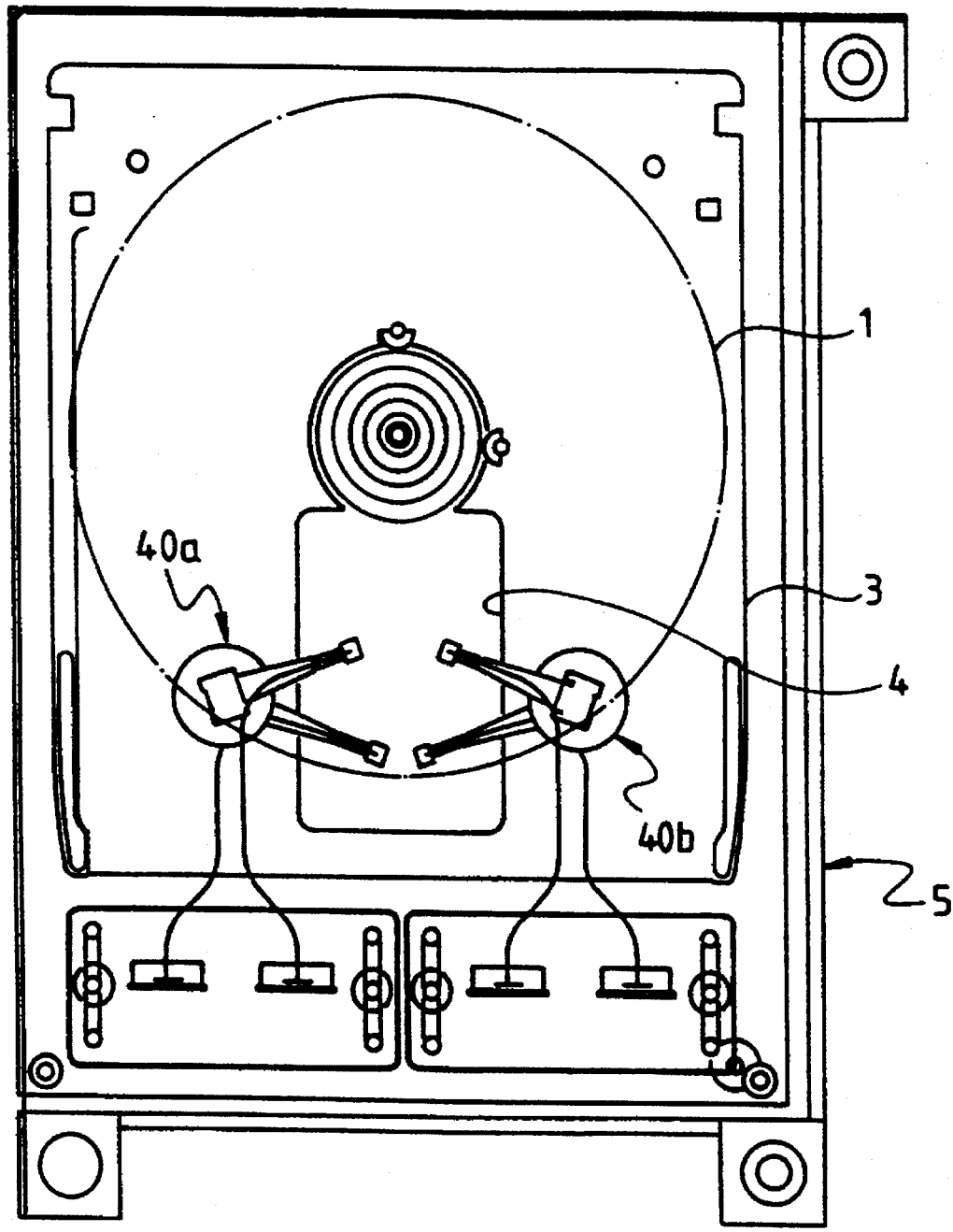
FIG. 7 is a plan view of one embodiment of optical disk drive having the multi-head device of the present invention.

FIG. 7 shows a preferred embodiment of optical disk drive 5 on which optical disk 1 is loaded while received in a caddy 3 having an opening 4 which is opened to expose part of the disk. In this optical disk drive 5, two multi-head devices 40a and 40b may be disposed on each side of opening 4. In this case, optical disk drive 5 provides four user channels.

Figure 8:
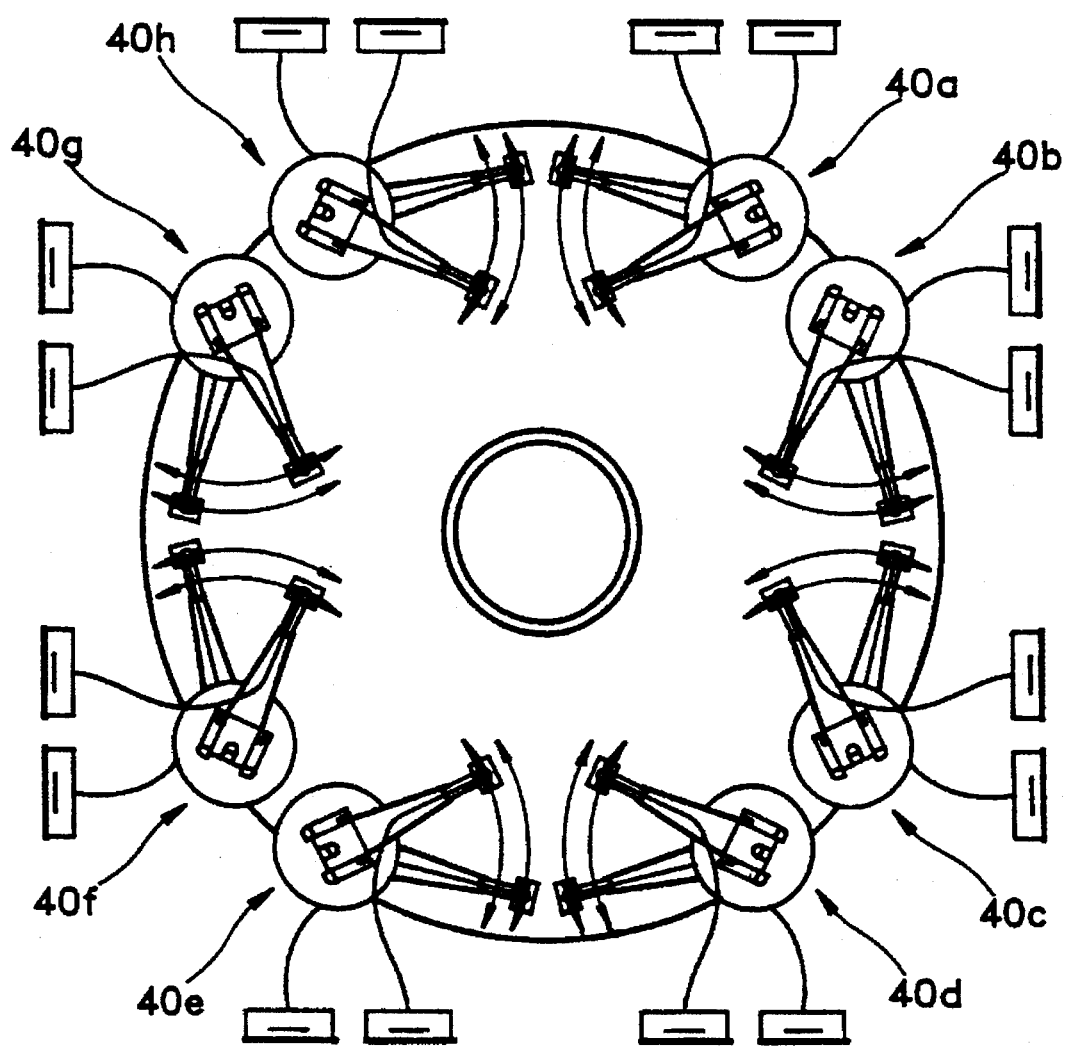
FIG. 8 is a schematic plan view of another embodiment of optical disk drive having the multi-head device of the present invention.

FIG. 8 shows another preferred embodiment of an optical disk drive on which only optical disk 1 such as a compact disk or laser disk is loaded without a caddy. In this embodiment, eight multi-head devices 40a–40h can be arranged thereby providing sixteen user channels in total.

In this invention, the multi-head device may be improved to drive only a single optical head so that it can be used in various optical disk drives. In this case, the optical disk drive can be made ultra-slim. Further, one multi-head disk can be constructed to commonly have three or more optical heads, thereby further increasing the number of user channels.

The recording/reproducing system for multiple users of the present invention is very convenient because multiple users can process information at any time, and enjoys a stability of processing on a par with the hard disk drive of a computer.

What is claimed is:

1. A multi-head device for optically reading information from and writing information on a single optical disk, said device comprising:
    a plurality of rotating plates rotatably supported about an axis;
    a plurality of arm members, each arm member being connected to a respective rotating plate and including, on a front portion, an optical head including an objective lens;
    driving means for respectively rotating said rotating plates; and
    focusing means for controlling focusing of each of said objective lenses in response to vibrations of the optical disk.

2. The multi-head device according to claim 1 wherein each of said optical heads comprises a light source for generating a light signal and an optical fiber waveguide for transmitting the light signal to said objective lens of said optical head.

3. The multi-head device according to claim 2 wherein each of said objective lenses has a respective incoming plane on which a light signal is incident, a respective outgoing plane perpendicular to the respective incoming plane, and a reflection plane for reflecting light between the incoming and outgoing planes to focus the light signal on the optical disk.

4. The multi-head device according to claim 3 wherein each of said optical heads comprises a grating attached to an objective lens at the incoming plane for transmitting an incident light signal and diffracting light reflected from the optical disk, and a photodetector attached to said grating for detecting light diffracted by said grating.

5. The multi-head device according to claim 1 wherein said driving means includes respective driving coils attached to corresponding rotating plates for generating an electromagnetic field, and a magnet generating a magnetic flux for interacting with the electromagnetic field produced by said driving coils.

6. The multi-head device according to claim 1 wherein said focusing means includes a slider, a focusing coil wound around said slider for generating an electromagnetic field, and a magnet generating a magnetic field for interacting with the electromagnetic field produced by said focusing coil for moving said focusing coil toward and away from the optical disk.

7. The multi-head device according to claim 1 wherein said focusing means includes a piezo-electric element for varying incidence of the light signal on said objective lens.

8. The multi-head device according to claim 1 comprising a respective spring member mounted on each of said front portions of said arm members, and a respective slider mounted on each of said spring members, one of said objective lenses being mounted on each of said sliders.

9. The multi-head device according to claim 8 wherein each of said sliders includes a groove for creating an air cushion between said sliders and the optical disk during movement of said sliders.

10. A recording/reproducing system in which multiple users are able to record information on and reproduce information from an optical disk, said system comprising:
    an optical head portion having a plurality of optical heads, each optical head emitting a respective light signal for reading information from and writing information on the optical disk;
    a plurality of channels, each channel having a data input port and a data output port; and
    a data processing portion for processing signals input via respective data input ports for driving said optical heads and for processing signals read out through said optical heads to respective output ports.

11. The recording/reproducing system according to claim 10 wherein said optical head portion comprises at least one multi-head device having at least two optical heads.

12. The recording/reproducing system according to claim 11 wherein said multi-head device comprises:
    a plurality of rotating plates rotatably supported about an axis;
    a plurality of arm members, each arm member being connected to a respective rotating plate and including, on a front portion, an optical head including an objective lens;
    driving means for respectively rotating said rotating plates; and
    focusing means for controlling focusing of each of said objective lenses in response to vibrations of the optical disk.

13. The recording/reproducing system according to claim 12 wherein said driving means includes respective driving coils attached to corresponding rotating plates for generating an electromagnetic field, a magnet generating a magnetic flux for interacting with the electromagnetic field produced by said driving coils, and a yoke for forming a magnetic path for said magnet.

14. The recording/reproducing system according to claim 12 wherein said focusing means includes a slider, a focusing coil wound around said slider for generating an electromagnetic field, and a magnet generating a magnetic field for interacting with the electromagnetic field produced by said focusing coil for moving said focusing coil toward and away from the optical disk.

15. The recording/reproducing system according to claim 12 wherein said focusing means includes a piezo-electric element for varying incidence of the light signal on said objective lens.

16. The recording/reproducing system according to claim 12 comprising a respective spring member mounted on each of said front portions of said arm members, and a respective slider mounted on each of said spring members, one of said objective lenses being mounted on each of said sliders.

17. The recording/reproducing system according to claim 16 wherein each of said sliders includes a groove for creating an air cushion between said sliders and the optical disk during movement of said sliders.

18. The recording/reproducing system according to claim 11 wherein each of said optical heads comprises a light source for generating a light signal, and an optical fiber waveguide for transmitting the light signal to the objective lens of said optical head.

19. The recording/reproducing system according to claim 11 wherein each of said objective lenses has a respective incoming plane on which a light signal is incident, a respective outgoing plane perpendicular to the respective incoming plane, and a reflection plane for reflecting light between the incoming and outgoing planes to focus the light signal on the optical disk.

20. The recording/reproducing system according to claim 19 wherein each of said optical heads comprises a grating attached to an objective lens at the incoming plane for transmitting an incident light signal and diffracting light reflected from the optical disk, and a photodetector attached to said grating for detecting light diffracted by said grating.

21. The recording/reproducing system according to claim 10 wherein said data processing portion comprises:

an analog-to-digital converter for converting an analog signal input via the data input port of one channel into a digital signal;

a compressor for compressing the input signal digitized by said analog-to-digital converter;

a modulator for modulating the signal compressed by said compressor to drive respective optical heads of said optical head portion;

a demodulator for demodulating a detected signal from said respective optical heads;

a decompressor for decompressing compressed information of the signal detected by said decompressor; and a digital-to-analog converter for converting a signal decompressed by said decompressor into an analog signal for transmission through a data output port.

* * * * *